(12) United States Patent
Simeone et al.

(10) Patent No.: US 6,945,071 B1
(45) Date of Patent: Sep. 20, 2005

(54) LINEARLY ACTUATED AUTOMATIC FRESH AIR EXCHANGE

(75) Inventors: Robert S. Simeone, Bridgeport, NY (US); Yiming Yu, Jamesville, NY (US); Mark J. Perkovich, Fayetteville, NY (US)

(73) Assignee: Carrier Corporation, Farmington, CT (US)

( * ) Notice: Subject to any disclaimer, the term of this patent is extended or adjusted under 35 U.S.C. 154(b) by 4 days.

(21) Appl. No.: 10/901,605

(22) Filed: Jul. 29, 2004

(51) Int. Cl.$^7$ ............................................. F25D 17/06
(52) U.S. Cl. .............................. 62/412; 62/190; 62/244
(58) Field of Search .......................... 62/173, 180, 190, 62/204, 239, 244, 277, 412

(56) References Cited

U.S. PATENT DOCUMENTS

| | | | |
|---|---|---|---|
| 5,265,437 A | * | 11/1993 | Saperstein et al. ............. 62/243 |
| 5,458,188 A | * | 10/1995 | Roehrich et al. .............. 165/64 |
| 6,694,765 B1 | * | 2/2004 | Waldschmidt et al. ......... 62/234 |
| 6,698,212 B2 | * | 3/2004 | Viegas et al. ................. 62/50.2 |

* cited by examiner

*Primary Examiner*—Melvin Jones (57) ABSTRACT

Fresh air exchange is achieved by uncovering two ports which, respectively, allow stale air to leave the trailer through a high pressure duct and fresh outside air to enter the trailer through a low pressure duct. The trailer end of the ducts are connected to the refrigeration unit evaporator section where the evaporator fan provides the pressure differential. The opposite ends of the ducts are connected to a bracket mounted on the refrigeration unit frame and are exposed to the outside fresh air through a hole in the refrigeration unit's grille when the cover over the ducts has been opened by the linear solenoid under the control of the microprocessor.

9 Claims, 7 Drawing Sheets

LINEARLY ACTUATED AUTOMATIC FRESH AIR EXCHANGE

BACKGROUND OF THE INVENTION

Trailer refrigeration units are controlled by a microprocessor which receives inputs indicating the temperature, humidity, etc. in the conditioned space and controls the refrigeration system responsive to the inputs. Additionally, the microprocessor records the inputs such that the history of the load during the trip is recorded. Accordingly, it is possible to determine when and why a load is spoiled, thawed or the like. Perishable cargo such as fruit, vegetables and flowers produce, and are affected by, gases. Ethylene, for example, is produced in the ripening of bananas and its presence promotes ripening while respiration of the "live" cargo produces carbon dioxide and requires oxygen. It is therefore preferable to introduce some fresh air with the recirculating air, where perishable cargo is present, if spoilage or premature ripening of the load is to be avoided.

In a trailer, the load normally occupies much of the available space such that the flow paths for the conditioned air are located in the space between the load and the trailer ceiling, walls, floor, and the channels defined by the pallets on which the load sits. To minimize the wastage of conditioned space, only the expansion device, the evaporator, the evaporator fan, necessary ducting and sensors are located in the conditioned space. The rest of the refrigeration unit and its controls are located on the exterior of the trailer and are powered by an external power supply such as a diesel engine or the unit may be connected to the electric grid.

SUMMARY OF THE INVENTION

In the present invention an automatically operated fresh air vent is provided to introduce some ambient/fresh air into the air circulating in the trailer and to exhaust some air from the trailer such as is done to provide some fresh air in commercial buildings. When the evaporator fan is running and the fresh air vent is open, the pressure differential across the evaporator fan is used to draw in fresh air and to exhaust stale air. The fresh air vent of the present invention has only a closed position and a fully open position. The fresh air vent mechanism is operated by a linear action solenoid and is biased to a closed position by a spring. The interval and duration of the opening of the fresh air vent is controlled by the microprocessor. The microprocessor based controller of the refrigeration unit automatically records the position of the fresh air vent as well as the evaporator fan speed, and the time at which the vent opens and closes.

It is an object of this invention to automatically control the opening, and closing of an air exchange device.

It is another object of this invention to selectively provide a supply of fresh air to a perishable cargo.

It is a further object of this invention to provide a more reliable and more economical automatic air exchange device. These objects, and others as will become apparent hereinafter, are accomplished by the present invention.

Basically, fresh air exchange is achieved by uncovering two ports which, respectively, allow stale air to leave the trailer through a high pressure duct and fresh outside air to enter the trailer through a low pressure duct. The trailer end of the ducts are connected to the refrigeration unit evaporator section where the evaporator fan provides the pressure differential. The opposite ends of the ducts are connected to a bracket mounted on the refrigeration unit frame and are exposed to the outside fresh air through a hole in the refrigeration unit's grille when the cover over the ducts has been opened by the linear solenoid under the control of the microprocessor.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENTS

Figure 1:
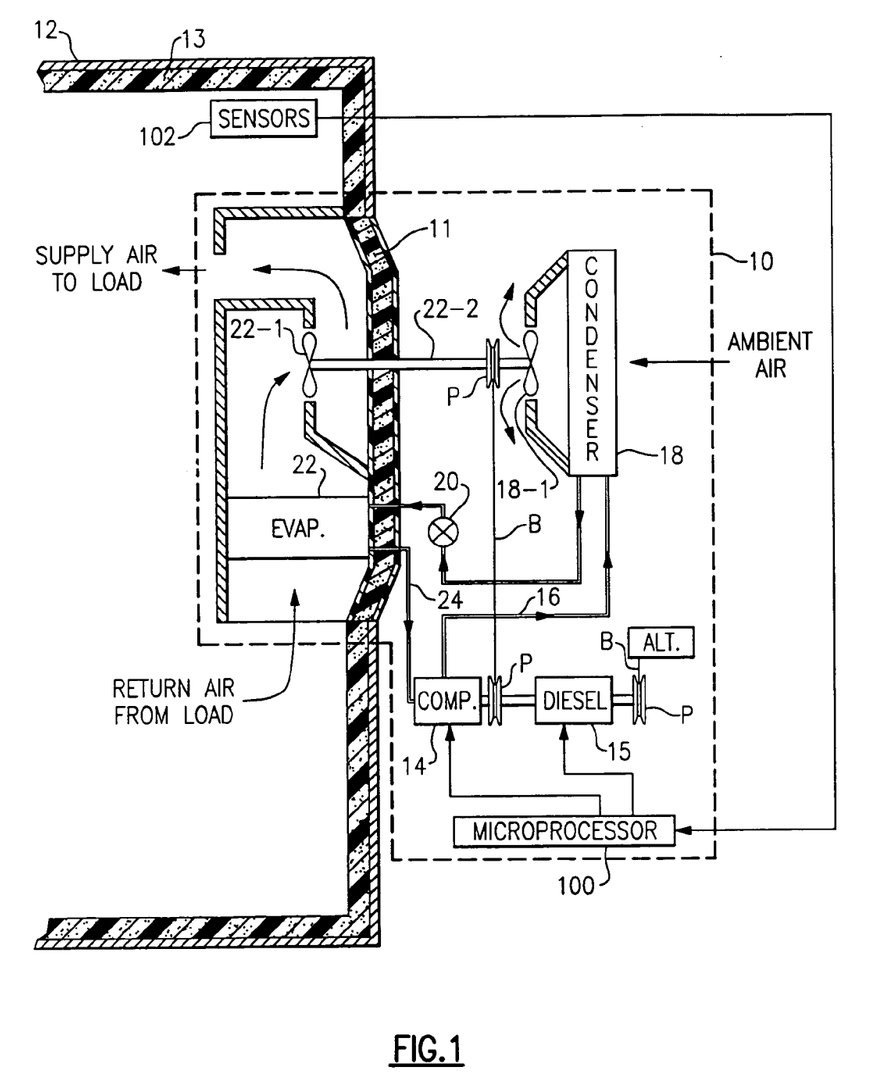
FIG. 1 is a simplified schematic diagram of a trailer and its refrigeration unit.

In FIG. 1, the numeral 10 generally designates a refrigeration unit which is mounted on a trailer 12. Insulation 11 and 13 line the pod portion of unit 10 and trailer 12, respectively, and separate the portions of refrigeration unit 10 which are located in trailer 12 from the portions located external to the conditioned area. Refrigeration unit 10 includes a fluid circuit serially including compressor 14, discharge line 16, condenser 18, expansion device 20, evaporator 22 and suction line 24. Compressor 14 is driven by diesel engine 15 under the control of microprocessor 100 responsive to inputs from sensors 102 which includes sensors for temperature, pressure, etc. Evaporator 22, evaporator fan 22-1 and a portion of evaporator fan drive shaft 22-2 are located within trailer 12 and the expansion device 20 can be within the trailer 12, or just outside. Microprocessor 100 controls both compressor 14 and diesel engine 15. Diesel engine 15 directly drives compressor 14 and is connected via pulleys, P, and a belt, B, to drive shaft 22-2 for driving condenser fan 18-1 and evaporator fan 22-1, respectively. When evaporator fan 22-1 is driven it causes conditioned air from evaporator 22 to be distributed through trailer 12 and return air to be delivered back to evaporator 22. Diesel engine 15 is also connected via a pulley, P, and a belt, B, to alternator 26 which can then supply electric power, as required, to unit 10.

Figure 2:
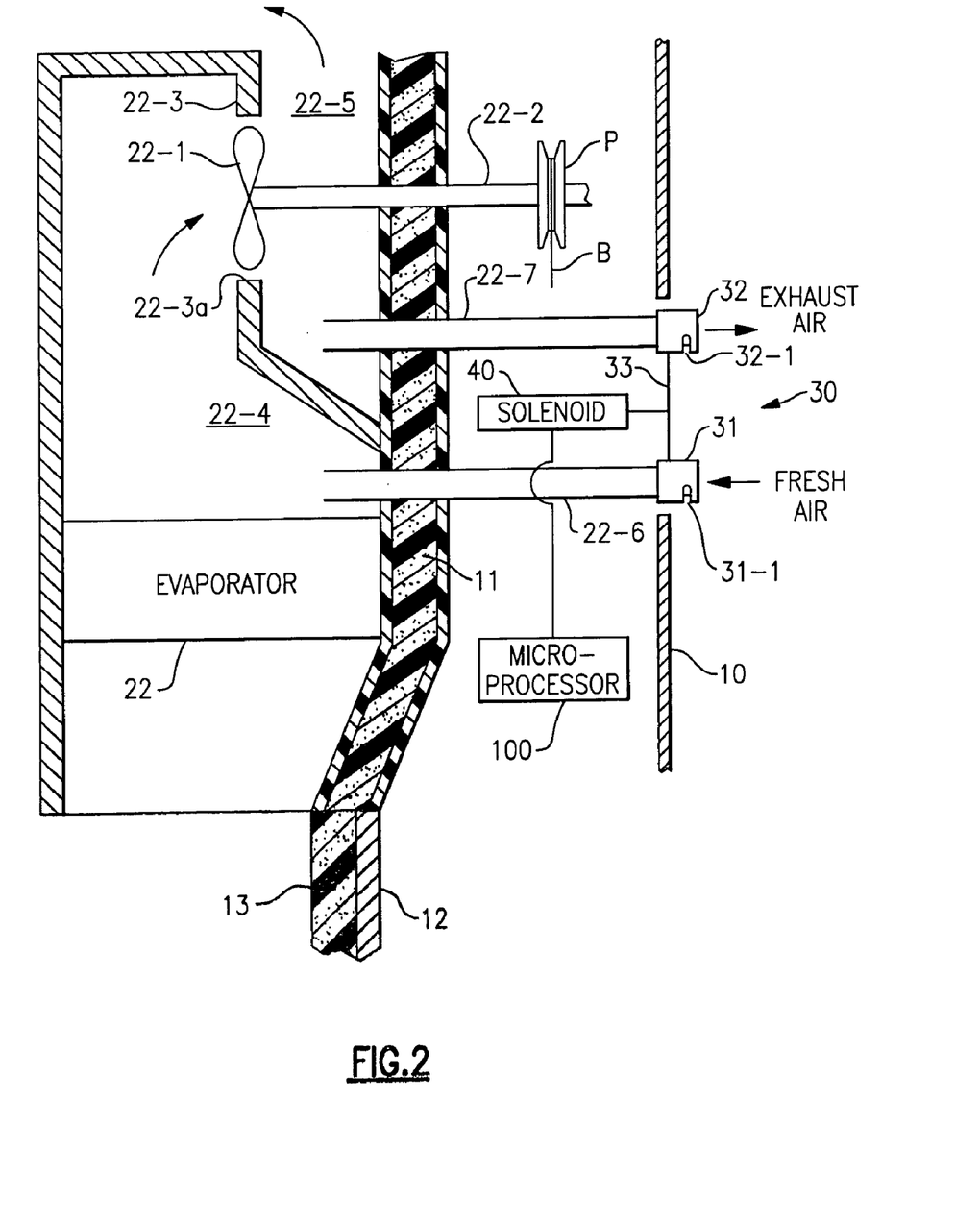
FIG. 2 is a simplified schematic representation of the fresh air vent structure.

FIG. 2 is a more detailed depiction of a portion of the FIG. 1 system adding details of the fresh air vent structure, or cap assembly, which is collectively labeled 30. As will be described in detail below, tubes or ducts 22-6 and 22-7, respectively, extend from points upstream and downstream, respectively, of evaporator fan 22-1 to points near to the grille of refrigeration unit 10. Caps consisting of larger tubes 31 and 32, respectively, with blanked ends and slots 31-1 and 32-1, respectively, for openings are placed over the ends of ducts 22-6 and 22-7, respectively. Caps 31 and 32 are connected by webbing 33 such that they move axially as a unit. The cap assembly 30 is made up of caps 31 and 32 and webbing 33 which are, preferably, made as, or assembled as, a single unit which is suitably secured to solenoid 40. When solenoid 40 is energized, the cap assembly 30 moves to the right from its closed position, as illustrated in FIG. 2, allowing the slots 31-1 and 32-1 in the cap assembly 30 to be in fluid communication with ducts 22-6 and 22-7, respectively, to allow fresh air into, and stale air out of, the trailer 12.

The evaporator fan 22-1 is located in opening 22-3*a* of fan housing 22-3 and, when operating, coacts therewith to separate chamber 22-4 from chamber 22-5 such that chamber 22-4 is at evaporator fan suction pressure and chamber 22-5 is at evaporator fan discharge pressure. Note that both chambers 22-4 and 22-5 are downstream of evaporator 22. The first flow path defined by duct 22-6 connects to the return air path just upstream of evaporator fan 22-1 and, when cap 31 is in its open position, permits some fresh air to enter chamber 22-4. The supplying of a portion of atmospheric air through duct 22-6 is possible because the pressure in chamber 22-4 is fan suction pressure which is less than ambient pressure. The second flow path defined by duct 22-7 connects to the return air path just downstream of evaporator fan 22-1 and fan housing 22-3 and, when cap 32 is in its open position, permits a portion of return air to be discharged into the atmosphere since chamber 22-5 is at fan discharge pressure which is above ambient. The frequency and duration of the opening of caps 31 and 32 together with the speed of evaporator fan 22-1 determine the amount of air being exhausted and supplied. Microprocessor 100 is connected to diesel engine 15 which controls evaporator fan 22-1, and is connected to and controls solenoid 40 which controls the opening and closing of caps 31 and 32. Microprocessor 100 is therefore capable of recording the supplying of fresh air during a trip. If desired, a gas sensor, such as a carbon dioxide sensor, may be located in trailer 12 and connected to microprocessor 100 such that solenoid 40 can be actuated to open caps 31 and 32, as required, at other than the programmed times and frequency.

Figure 3:
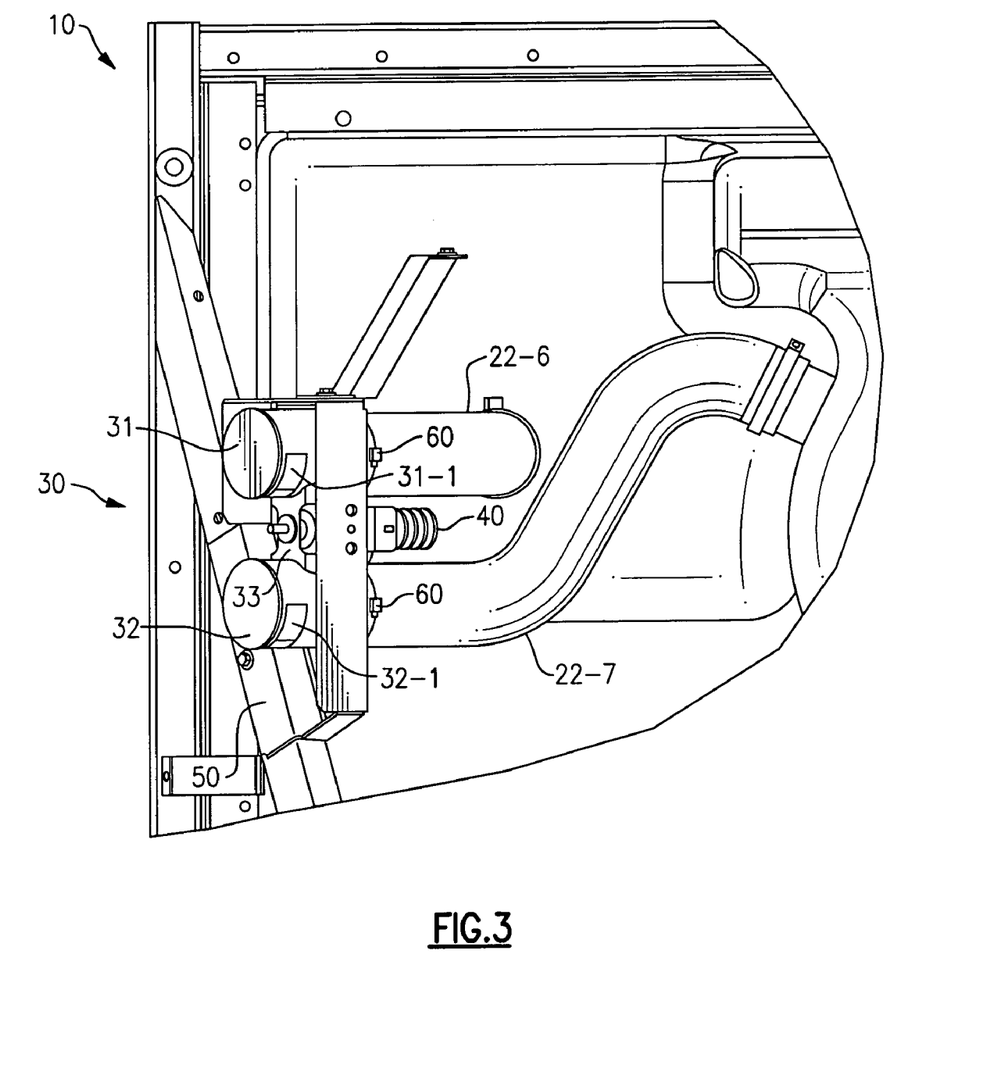
FIG. 3 is a pictorial view of the assembled fresh air vent structure.

Referring specifically to FIG. 3, it will be noted that caps 31 and 32 are reversed from their FIG. 2 positions since duct 22-7 is not straight. Caps 31 and 32 have circumferentially extending slots defining ports 31-1 and 32-1, respectively. Ports 31-1 and 32-1 are approximately 180° in extent and have a width nominally equal to the stroke of caps 31 and 32, respectively. Cap assembly 30 and solenoid 40 are suitably secured together and are supported by welded bracket 50 which is secured to refrigeration unit 10.

Figure 4:
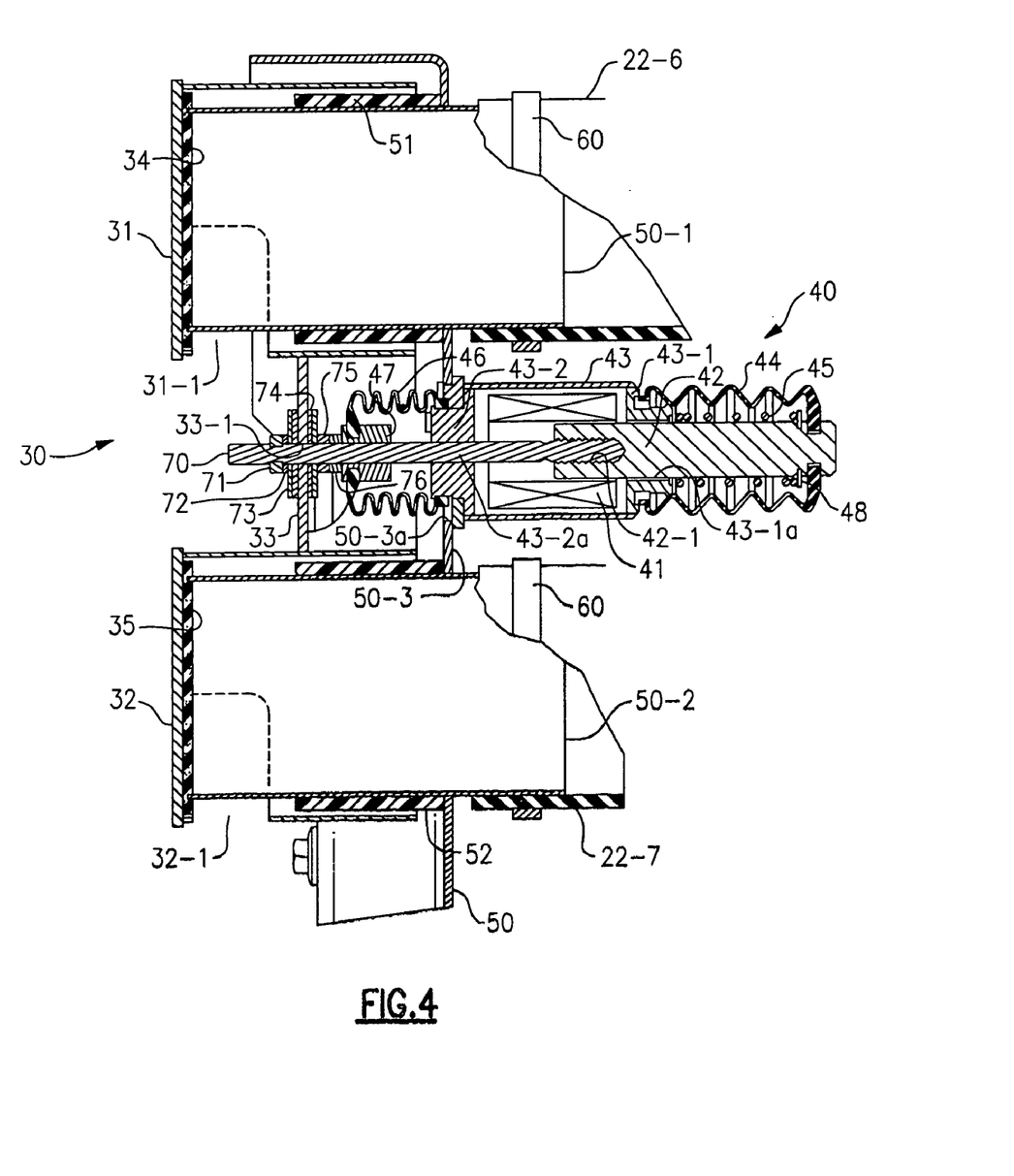
FIG. 4 is a partially cutaway view of the fresh air vent structure of FIG. 3 in the closed position.
Figure 5:
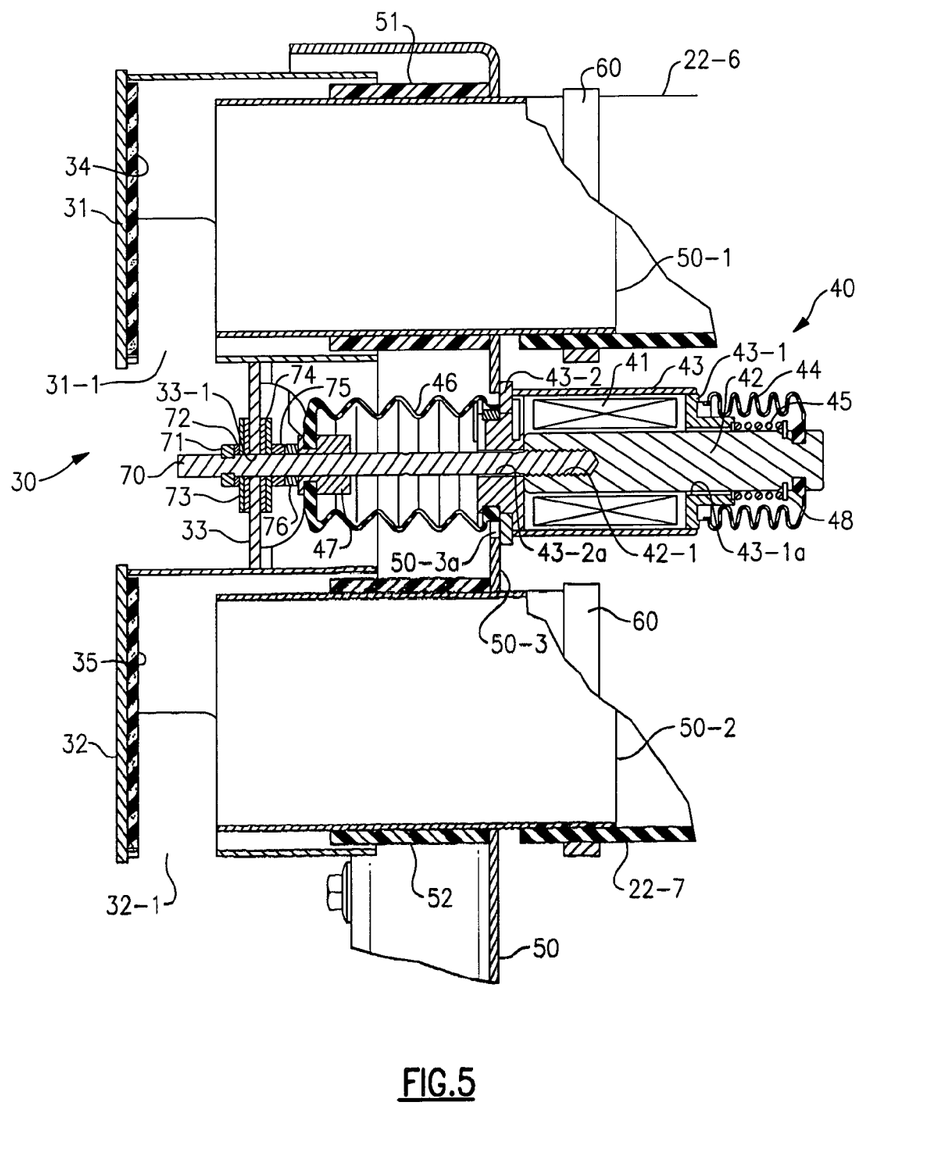
FIG. 5 is a partially cutaway view of the FIG. 4 structure in the open position.

Taking FIGS. 3–5 together, it will be noted that bracket 50 includes tubular portions 50-1 and 50-2, to which ducts 22-6 and 22-7, respectively, are secured by clamps 60, and wall portion 50-3. Wall portion 50-3 is located between tubular portions 50-1 and 50-2 and has an aperture 50-3*a* therein. Plastic sleeves 51 and 52 are located on tubular portions 50-1 and 50-2, respectively. Closed cell neoprene gaskets, or other suitable resilient material, 34 and 35 line the blanked ends of caps 31 and 32, respectively. As best shown in FIG. 4, gaskets 34 and 35 seal against the outer ends of tubular portions 50-1 and 50-2, respectively, to close off air flow between the trailer 12 and the atmosphere. Sleeve 51 is located between tubular portion 50-1 and cap 31 to provide vibration isolation. Similarly, sleeve 52 is located between tubular portion 50-2 and cap 32.

Linear action solenoid 40 may be any suitable type, such as a latch and hold solenoid, and includes one, or more, coils 41 and a core 42. Coil 41 is located in housing 43 which has end pieces 43-1 and 43-2 having apertures 43-1*a* and 43-2*a*, respectively. Bellows 44 is suitably secured to end piece 43-1 and to one end of core 42 which extends through aperture 43-1*a* and coil spring 45 is located within bellows 44. Spring 45 engages end piece 43-1 and spring clip or retainer 48 which, is located on core 42 at the opposite end of bellows 44 and tends to move the structure to the FIG. 4 position when the solenoid 40 is not powered. Bellows 46 is suitably secured to end piece 43-2 and to gland nut 47.

Going from the left side of FIGS. 4 and 5, threaded shaft 70 threadedly engages jam nut 71 and serially passes through lock washer 72, washers 73, aperture 33-1, washers 74, threadedly engages jam nuts 75 and 76, threadedly engages gland nut 47, passes through bellows 46, aperture 43-2*a* and threadedly engages threaded bore 42-1 of core 42. With jam nuts 71, 75 and 76 tightened, washers 72 and 73, webbing 33, and washers 74 are squeezed therebetween such that cap assembly 30 moves as a unit with threaded shaft 70. Since threaded shaft 70 threadedly engages gland nut 47 which is secured to bellows 46 and core 42, threaded shaft 70, gland nut 47 and bellows 46 move with core 42 responsive to the actuation and deactuation of solenoid 40.

Referring specifically to FIG. 4, solenoid 40 is de-energized and fresh air vent or cap assembly 30 is closed. Compression coil spring 45 acting against fixed end piece 43-1 and spring retainer 48 causes core 42 to move to the right, as illustrated. Movement of core 42 causes corresponding movement of threaded shaft 70 which is secured thereto and of cap assembly 30 which is secured thereto via web 33. Bellows 46 which is secured to gland nut 47 and end piece 43-2 collapses as gland nut 47 moves towards end piece 43-2. Movement of cap assembly 30 to the right, as described, causes the outer ends of tubular portions 50-1 and 50-2 to engage gaskets 34 and 35, respectively, in a valving action which prevents fluid communication between the atmosphere and trailer 12 via ducts 22-6 and 22-7, respectively. If solenoid 40 is energized, structure will move from the FIG. 4 position to the FIG. 5 position thereby opening cap assembly 30. Specifically, when coil 41 is energized, core 42 is caused to move to the left as illustrated. Since bellows 44 and spring retainer 48 are secured to core 42, this causes bellows 44 to collapse as spring 45 is compressed. With threaded shaft 70 being threadably secured to gland nut 47 and core 42, movement of core 42 moves threaded shaft 70 to the left, as illustrated, separating gland nut 47 and end piece 43-2 and expanding bellows 46 which is secured thereto. Because cap assembly 30 is also secured to threaded shaft 70, actuation of solenoid 40 causes cap assembly 30 to move to the FIG. 5 position in which gaskets 34 and 35 are moved from their seating position on the ends of tubular portions 50-1 and 50-2, respectively, opening slots 31-1 and 32-1, respectively, and connecting ducts 22-6 and 22-7 to atmosphere.

With fan 22-1 running and cap assembly 30 in the open position of FIG. 5, chamber 22-4 is on the suction side of fan 22-1 and is therefore at less than ambient pressure. Accordingly, fresh air enters slot 31-1, passes through tubular portion 50-1 and duct 22-6 into chamber 224 where the fresh air mixes with return air. The mixture of fresh and stale recirculating air is drawn from chamber 224 by fan 22-1 and is discharged into chamber 22-5 at a pressure which is greater than atmospheric. Accordingly, a small portion of this air mixture passes from chamber 22-5 into duct 22-7 serially passing through tubular portion 50-2 and slot 32-1 into the atmosphere. The remaining air delivered to chamber 22-5 by fan 22-1 circulates through trailer 12.

Figure 6:
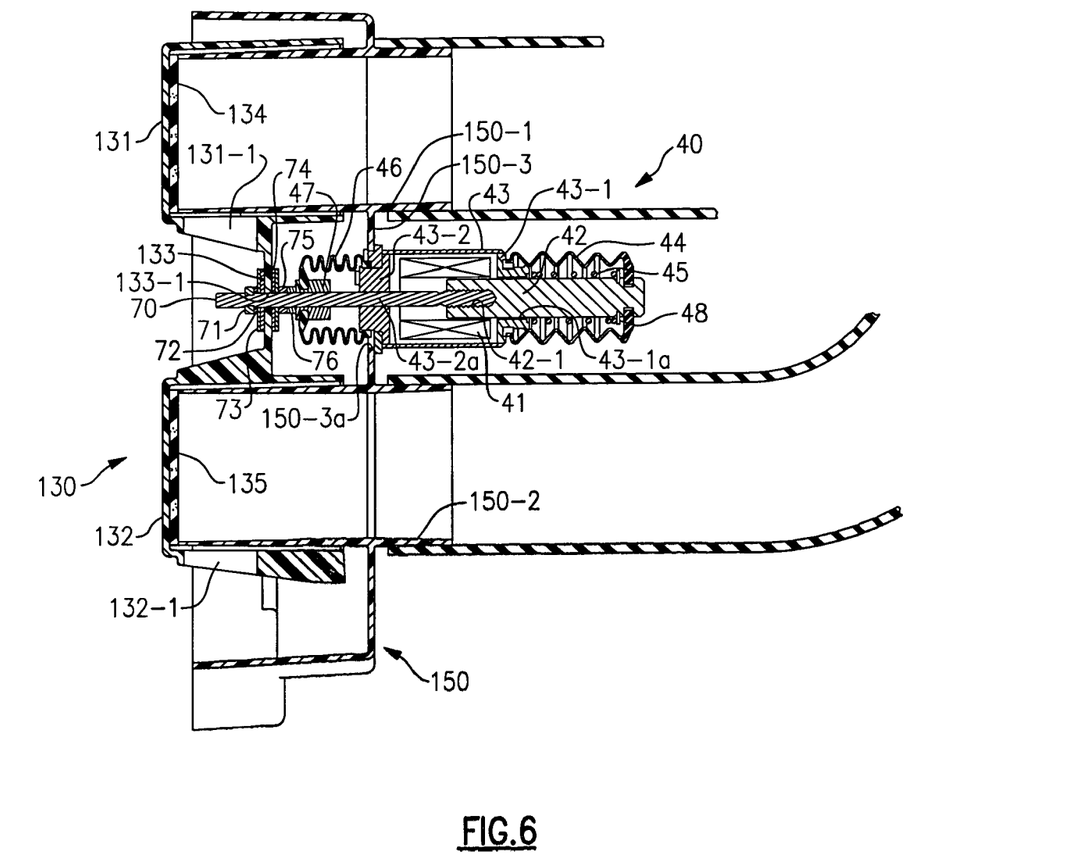
FIG. 6 is a partially cutaway view of a modified fresh air vent structure in the closed position.
Figure 7:
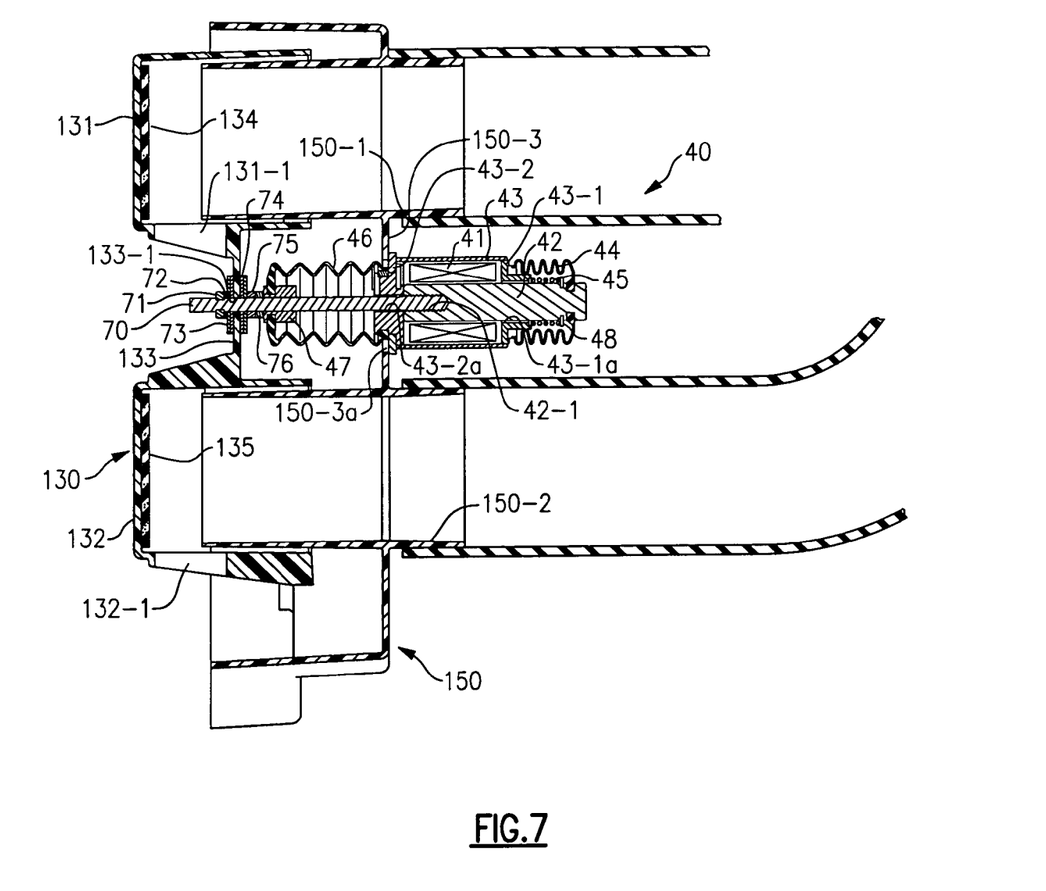
FIG. 7 is a partially cutaway view of the FIG. 6 structure in the open position.

The structure illustrated in FIGS. 6 and 7 is the same as that in FIGS. 4 and 5 except for the details of the cap and bracket structure. In FIGS. 4 and 5, the cap structure 30 is made up of a plurality of parts 31, 32 and 33 which are welded or otherwise suitably assembled. Cap structure 130 of FIGS. 6 and 7 has portions 131, 132 and 133 made as a single piece of plastic or metal which has been molded, stamped out, or otherwise suitably formed. In FIGS. 4 and 5, the bracket structure 50 is made up of tubular portions 50-1 and 50-2 and wall portion 50-3 which are welded or otherwise suitably assembled. Bracket structure 150 of FIGS. 6 and 7 has portions 150-1, 150-2 and 150-3 made as a single piece of plastic or metal which has been molded, stamped out, or otherwise suitably formed. The embodiment of FIGS. 6 and 7 eliminates sleeves 51 and 52. So, the embodiments of 6 and 7 operates the same as the embodiments of FIGS. 4 and 5 and differ only in the cap structure 30, bracket structure 50 and gaskets 34 and 35 which have been numbered 100 higher.

In operation, refrigeration unit 10 will operate under the control of microprocessor 100 to maintain the conditions in trailer 12 within a desired narrow range and to provide a history of conditions in trailer 12, as is conventional. Superimposed upon the conventional operation of refrigeration unit 10, microprocessor 100 controls the actuation of solenoid 40 to permit the drawing of fresh air into the recirculating air and for exhausting some of the stale recirculating air. The solenoid 40 together with spring 45, shaft 70 and cap structure 30 tends to act as a biased closed valve structure, seating on tubular portions 50-1 and 50-2 when solenoid 40 is de-energized closing off the air in trailer from the atmosphere. Microprocessor 100 may be programmed to activate solenoid 40 on a cyclic basis, to remain open for fixed periods of time, or permanently open responsive to set load temperatures indicative of a "live" load or in response to a condition sensed by sensors 102, such as carbon dioxide, percentage. Fan 22-1 should be operating whenever solenoid 40 is energized in order to establish the necessary pressure differential for the required air circulation. Since solenoid 40 must be powered to open, power to run fan 22-1 will normally also be available.

Although preferred embodiments of the present invention have been illustrated and described, other changes will occur to those skilled in the art. For example, a stepper motor may be used in place of solenoid and this would provide a range of opening. It is therefore intended that the scope of the present invention is to be limited only by the scope of the appended claims.

What is claimed is:

1. A refrigeration unit for conditioning and circulating air in a trailer, said refrigeration unit including an evaporator fan located downstream of an evaporator and a microprocessor for controlling and recording conditions in said trailer, said refrigeration unit further including:
    said fan producing a suction pressure upstream thereof and a discharge pressure downstream thereof;
    two flow paths between the interior of said trailer and ambient atmosphere surrounding said trailer;
    a first one of said two flow paths is for supplying atmospheric air to air circulating in said trailer and extends from a point which is just upstream of said fan and which is at suction pressure and said ambient atmosphere whereby atmospheric air is supplied to circulating air;
    a second one of said two flow paths is for discharging circulating air from said trailer to said ambient atmosphere and extends to said ambient atmosphere from a point which is just downstream of said fan and which is at discharge pressure;
    valve means normally biased to a position preventing fluid communication between either of said two flow paths and said ambient atmosphere; and
    means for moving said valve means to a position permitting fluid communication between the interior of said trailer and said ambient atmosphere via both of said flow paths responsive to said microprocessor.

2. The refrigeration trailer unit of claim 1 wherein said evaporator fan is located in said trailer at a location intermediate said two flow paths.

3. The refrigeration unit of claim 1 wherein said means for moving said valve means is a linear action solenoid.

4. The refrigeration unit of claim 1 wherein said valve means includes a pair of caps with blanked ends having openings therein and connected by a webbing such that both caps move as a unit.

5. The refrigeration-unit of claim 4 wherein said caps are lined with resilient material which is biased against the ends of tubes forming the outermost portions of said two flow paths when said valve means is closed.

6. The refrigeration unit of claim 5 wherein said means for moving said valve means is a linear action solenoid acted on by a spring which also acts to bias said valve means closed when said solenoid is not actuated.

7. The refrigeration unit of claim 4 wherein said pair of caps and said webbing are made as a single piece.

8. The refrigeration unit of claim 7 wherein said caps are lined with resilient material which is biased against the ends of tubes forming the outermost portions of said two flow paths when said valve means is closed.

9. The refrigeration unit of claim 8 wherein said means for moving said valve means is a linear action solenoid acted on by a spring which also acts to bias said valve means closed when said solenoid is not actuated.

* * * * *

UNITED STATES PATENT AND TRADEMARK OFFICE
Certificate

Patent No. 6,945,071 B1                                                              Patented: September 20, 2005

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Robert S. Simeone, Bridgeport, NY (US); Yiming Yu, Jamesville, NY (US); Mark J. Perkovich, Fayetteville, NY (US); and Richie C. Stauter, Fayetteville, NY (US).

Signed and Sealed this Twenty-third Day of September 2008.

*CHERYL J. TYLER*
*Supervisory Patent Examiner*
Art Unit 3744